(12) United States Patent
Fu et al.

(10) Patent No.: US 12,466,919 B2
(45) Date of Patent: Nov. 11, 2025

(54) POLYAMIC ACID, POLYIMIDE, AND ELEMENT FORMED THEREFROM

(71) Applicant: LCY CHEMICAL CORP., Kaohsiung (TW)

(72) Inventors: Chuan-Jen Fu, Kaohsiung (TW); Shih-Wei Lee, Kaohsiung (TW); Hsiao-Chu Lin, Kaohsiung (TW); Shu-Mei Yang, Kaohsiung (TW); Shih-Hung Huang, Kaohsiung (TW); Tzu-Yuan Shih, Kaohsiung (TW)

(73) Assignee: LCY CHEMICAL CORP., Kaohsiung (TW)

( * ) Notice: Subject to any disclaimer, the term of this patent is extended or adjusted under 35 U.S.C. 154(b) by 837 days.

(21) Appl. No.: 17/393,031

(22) Filed: Aug. 3, 2021

(65) Prior Publication Data

US 2022/0348717 A1    Nov. 3, 2022

(30) Foreign Application Priority Data

Apr. 15, 2021    (TW) .................................. 110113533

(51) Int. Cl.
 *C08G 73/00* (2006.01)
 *C08G 73/10* (2006.01)
 *G02F 1/1337* (2006.01)

(52) U.S. Cl.
 CPC ..... *C08G 73/1078* (2013.01); *C08G 73/1021* (2013.01); *C08G 73/1032* (2013.01); *C08G 73/1042* (2013.01); *C08G 73/105* (2013.01); *G02F 1/133723* (2013.01)

(58) Field of Classification Search
 CPC ............ C08G 73/1078; C08G 73/1021; C08G 73/1032; C08G 73/1042; C08G 73/105
 See application file for complete search history.

(56) References Cited

U.S. PATENT DOCUMENTS

| | | | |
|---|---|---|---|
| 2019/0079357 A1 | 3/2019 | Mizusaki et al. | |
| 2020/0073181 A1 | 3/2020 | Eckert et al. | |
| 2022/0282118 A1* | 9/2022 | Kwasny | C08G 73/1078 |

FOREIGN PATENT DOCUMENTS

| | | |
|---|---|---|
| CN | 101375444 A | 2/2009 |
| CN | 109370614 A | 2/2019 |
| JP | H11212097 A | 8/1999 |
| JP | 2017200991 A | 11/2017 |
| JP | 2019049661 A | 3/2019 |
| JP | 2021002016 A | 1/2021 |
| TW | 200831562 A | 8/2008 |

(Continued)

OTHER PUBLICATIONS

Li, J. et al., A study on the effect of spirocyclic structures in the main chain on the physical properties of copolyimides, 21 Macrol. Rapid. Comm'ns 1166 (Year: 2000).*

(Continued)

*Primary Examiner* — Robert C Boyle
(74) *Attorney, Agent, or Firm* — Muncy, Geissler, Olds & Lowe, P.C.

(57) ABSTRACT

A polyimide is provided, which contains at least one repeating unit selected from a group consisting of the following general formulas, M, N, and O):

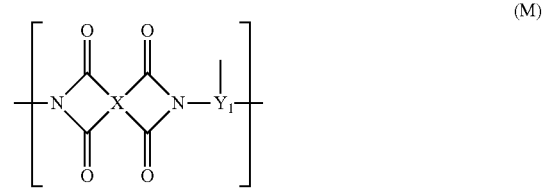

(M)

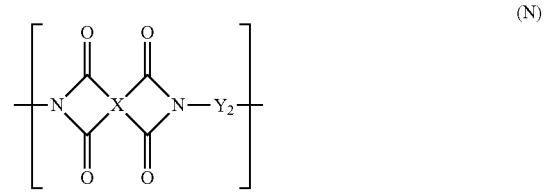

(N)

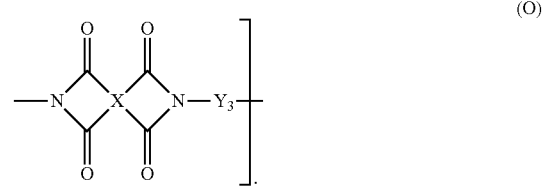

(O)

X is a residue derived from TCA represented by formula I. $Y_1$ is a residue derived from a diamine with a cardo structure. $Y_2$ is a residue derived from a diamine with the structure of a benzene ring, biphenyl, phenylbenzimidazole or phenylbenzoxazole. $Y_3$ is a residue derived from a diamine with an ether or an ester group.

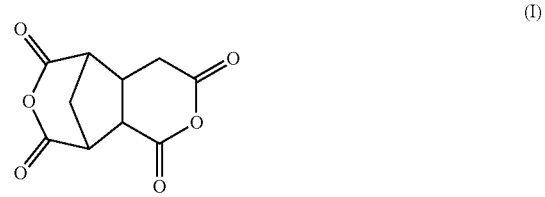

(I)

10 Claims, No Drawings

(56) References Cited

FOREIGN PATENT DOCUMENTS

TW      201819348 A    6/2018
WO   WO 2021/060270 A1  4/2021

OTHER PUBLICATIONS

JPH11212097 (translated by JPO) (Year: 1998).*
Japanese Office Action of its corresponding JP application No. 2021-192981 issued on Dec. 6, 2022; pp. 1-6.
Extended European Search Report, application No. 21213861.4, Jun. 21, 2022, 8 pages.
Office Action of its corresponding TW application issued on Dec. 27, 2021 (without English translations).

* cited by examiner

POLYAMIC ACID, POLYIMIDE, AND ELEMENT FORMED THEREFROM

CROSS REFERENCE TO RELATED APPLICATIONS

This application claims priority of Taiwan Patent Application No. 110113533 filed on Apr. 15, 2021, the entirety of which are incorporated by reference herein.

BACKGROUND DISCLOSURE

Field of the Disclosure

The present disclosure is related to a polyamic acid, a polyimide, and its application.

Description of the Related Art

LCD (liquid-crystal display) and AMOLED (Active Matrix Organic Light Emitting Diodes) displays are driven by LTPS (Low Temperature Poly-silicon) TFTs (Thin-Film Transistor). Due to the high temperature of the LTPS process, glass is conventionally used as a substrate. However, designers of display devices are recently pursuing characteristics such as lightness, thinness, and flexibility, and glass substrates can no longer meet these demands. Therefore, display manufacturers are looking for plastic materials that can be used to replace glass substrates.

Among plastic materials, polyimide is currently the most suitable plastic materials for flexibility and the application of transparent displays because polyimide has the characteristics of transparency, flexibility, sufficient mechanical strength, chemical resistance, excellent heat resistance, and good optical properties. Therefore, polyimide is widely used in various industries such as the plastics industry, the electronics industry, and the aerospace industry.

Although existing polyimide has generally met a variety of needs, it has not been entirely satisfactory in all respects. For example, in order to undergo the higher temperature processing of LTPS TFT, a transparent polyimide with high heat resistance is required. However, the heat resistance of the transparent polyimide currently on the market is still unlikely to meet this requirement. The details will be described below. Therefore, there is still a need for improvement of polyimide.

BRIEF SUMMARY

In accordance with some embodiments of the present disclosure, a polyimide is provided, containing at least one repeating unit selected from the group consisting of the following general formulas M, N, and O:

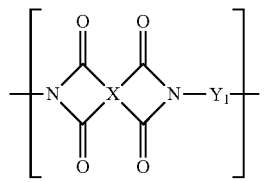

(M)

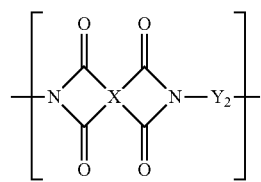

(N)

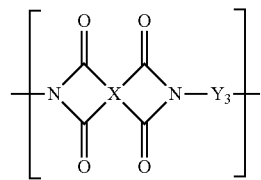

(O)

wherein X is a residue derived from TCA (3-(Carboxymethyl)-1,2,4-cyclopentanetricarboxylic acid 1,4:2,3-dianhydride) represented by formula I,

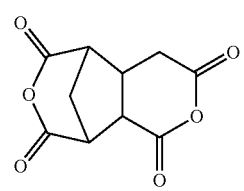

(I)

$Y_1$ is a residue derived from a diamine with a cardo structure, $Y_2$ is a residue derived from a diamine with the structure of a benzene ring, biphenyl, phenylbenzimidazole or phenylbenzoxazole, $Y_3$ is a residue derived from a diamine with an ether group or an ester group.

In accordance with some embodiments of the present disclosure, a polyamic acid is provided, containing at least one repeating unit selected from the group consisting of the following general formulas M", N" and O":

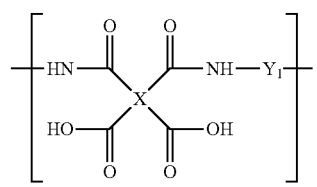

(M")

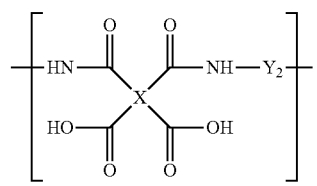

(N")

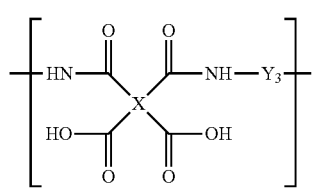

wherein X is a residue derived from TCA represented by formula I,

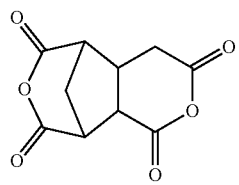

Y₁ is a residue derived from a diamine with a cardo structure,
Y₂ is a residue derived from a diamine with the structure of a benzene ring, biphenyl, phenylbenzimidazole, or phenylbenzoxazole,
Y₃ is a residue derived from a diamine with an ether group or an ester group.

In accordance with some embodiments of the present disclosure, an element is further provided, containing one or more of the polyimides described above.

In accordance with some embodiments of the present disclosure, a method of manufacturing the polyamic acid described above is provided, containing: reacting TCA (3-(Carboxymethyl)-1,2,4-cyclopentanetricarboxylic acid 1,4:2,3-dianhydride) represented by formula I with a diamine compound to form a polyamic acid, the diamine compound is at least one selected from the group consisting of y₁, y₂, and y₃,

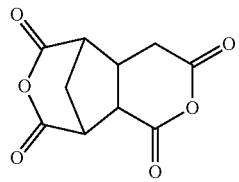

y₁ is a diamine with a cardo structure,
y₂ is a diamine with the structure of a benzene ring, biphenyl, phenylbenzimidazole, or phenylbenzoxazole,
y₃ is a diamine with an ether group or an ester group.

In accordance with some embodiments of the present disclosure, a method of manufacturing the polyimide described above is provided, containing: performing an imidization of the polyamic acid described above to form a polyimide.

In order to make the features of this disclosure obvious and easy to understand, the following examples are specially cited, combined with the accompanying drawings, and detailed descriptions are as follows. For other precautions, please refer to the technical field.

BRIEF DESCRIPTION OF THE DRAWINGS

None.

DETAILED DESCRIPTION

The followings describe a polyimide, a polyamic acid, and an optical element provided in the disclosure in detail. It should be understood that the following description provides many different embodiments or examples for implementing different aspects of some embodiments of the present disclosure. Specific elements and arrangements are described below to simplify and clarify some embodiments of the present disclosure. These are, of course, merely examples and are not intended to be limiting.

The term "about", "approximately" as used herein indicates the value of a given quantity that varies within 5% of the value, preferably 3% of the value, much preferably 1%, 2%, 1%, or 0.5% of the value. It is noted that, the quantity provided in the specification is an approximate quantity, that is, if there is no specific description of "about", "approximately", "about" and "approximately" can still be implied.

In this specification, "Cardo" refers to a structure with a quaternary carbon center, and two of the substituents form a cyclic structure. "Biphenyl" refers to a compound formed by linking two phenyl groups. "Phenylbenzimidazole" refers to a benzimidazole having a benzene ring substituent, wherein the benzimidazole refers to the structure:

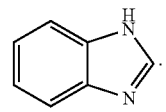

"Phenyl benzoxazole" refers to a benzoxazole having a benzene ring substituent, wherein benzoxazole refers to the structure:

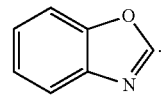

"Ether group" refers to a group formed by connecting two alkyl groups or aromatic groups with an oxygen atom. "Ester group" refers to the general formula —COOR, wherein R is an alkyl group or other groups other than hydrogen atoms.

A polyamic acid, a polyimide, and a manufacturing method thereof of the present disclosure will be described in detail below.

[Polyamic Acid]

The embodiment of the present disclosure provides a polyamic acid containing at least one repeating unit selected from the group consisting of the following general formulas M″, N″, and O″:

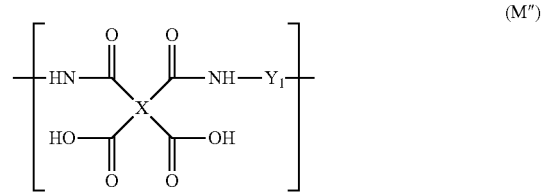

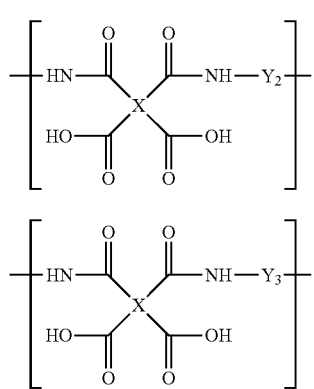

wherein X is a residue derived from TCA (3-(Carboxymethyl)-1,2,4-cyclopentanetricarboxylic acid 1,4:2,3-dianhydride) represented by formula I,

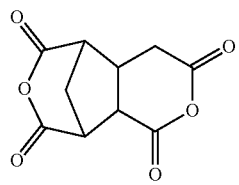

$Y_1$ is a residue derived from a diamine with a cardo structure, $Y_2$ is a residue derived from a diamine with the structure of a benzene ring, biphenyl, phenylbenzimidazole or phenylbenzoxazole, $Y_3$ is a residue derived from a diamine with an ether group or an ester group.

It should be noted that, in some embodiments of the present disclosure, a polyamic acid and a polyimide formed therefrom with good heat resistance and optical properties are provided by selecting monomer of specific structure and proportion. For example, $Y_1$ has a cardo structure. Since the quaternary carbon center of the cardo structure has two substituents to form a cyclic structure, the center cannot rotate freely and has strong rigidity. Therefore, $Y_1$ can provide excellent heat resistance and the desired optical properties at the same time. $Y_2$ has aromatic structures such as benzene ring and biphenyl, which also has strong rigidity. Therefore, $Y_2$ can provide excellent heat resistance, the desired optical properties, and linear coefficient of thermal expansion (CTE), etc. at the same time. $Y_3$ has a rotatable ether group or ester group, resulting in low rigidity. An ester group and an ether group have poor heat resistance itself, but can provide the desired optical properties and the characteristics of CTE.

In some embodiments, $Y_1$ can be derived, for example, from the residue of a diamine with a cardo structure. The quaternary carbon center of the diamine mentioned above needs to be located on the main chain of the polymer, wherein two of the substituents form a cyclic structure. In some preferred embodiments, $Y_1$ can be, for example, a residue derived from the structure shown below, but is not limited thereto:

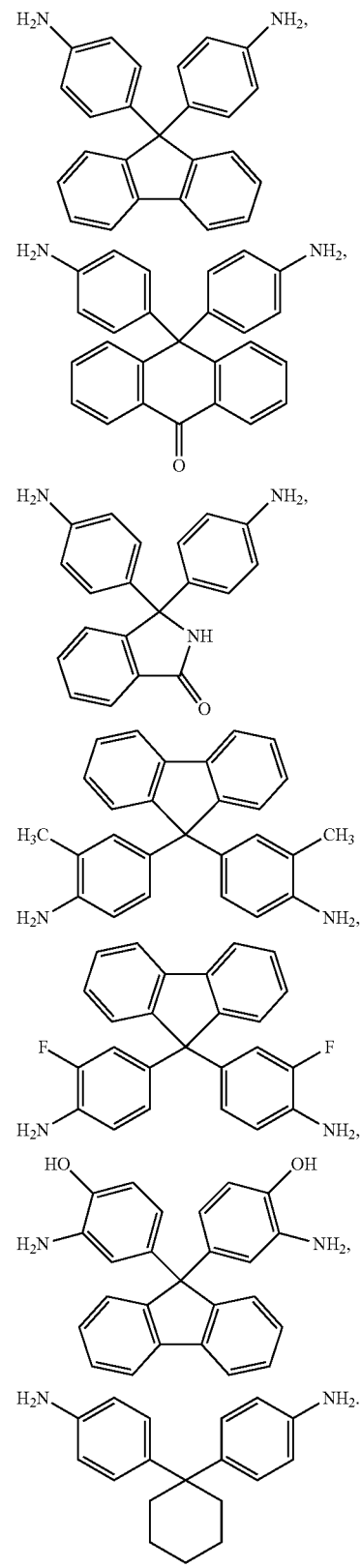

Specifically, $Y_1$ may preferably be a residue derived from 9,9-bis(4-aminophenyl) fluorene (FDA) represented by formula II.

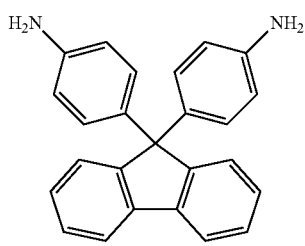
(II)

In some preferred embodiments, $Y_2$ is a residue derived from a diamine represented by formula III or IV,

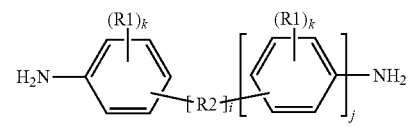
(III)

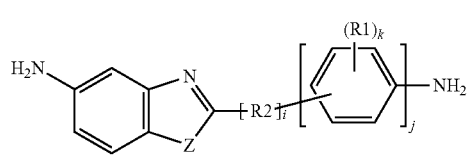
(IV)

wherein each R1 is independently *—H, *—F, *—Cl, *—CH$_3$ or *—CF$_3$;

R2 is *—C(O)NH—*;

Z is *—NH—* or *—O—*;

i and j are 0 or 1;

k is an integer of 0-4.

In some embodiments, $Y_2$ can be, for example, a residue derived from the structure shown below, but it is not limited thereto:

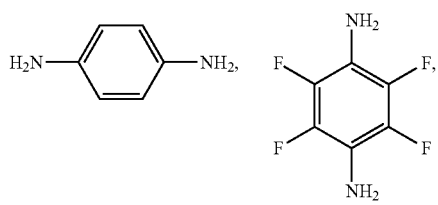

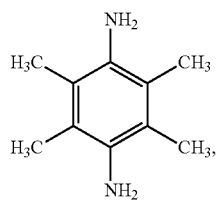

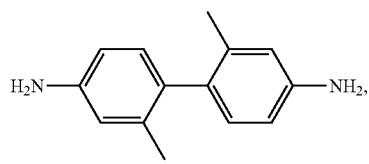

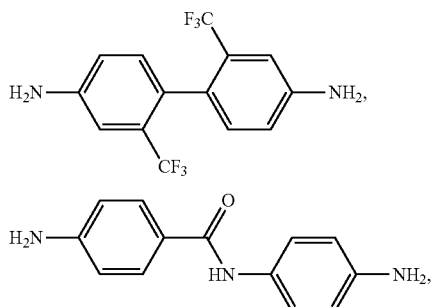

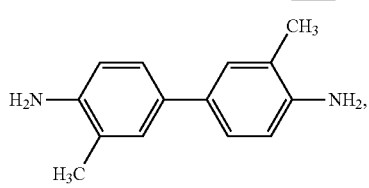

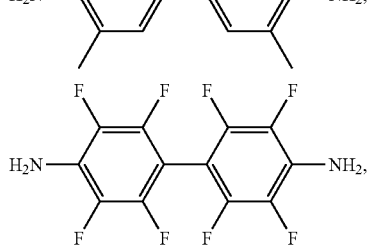

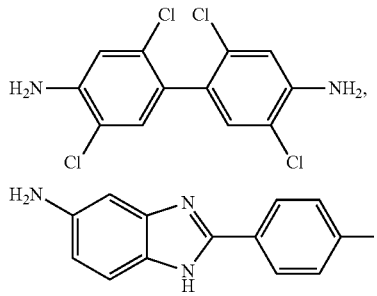

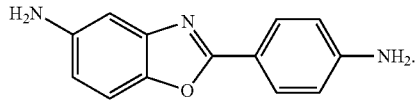

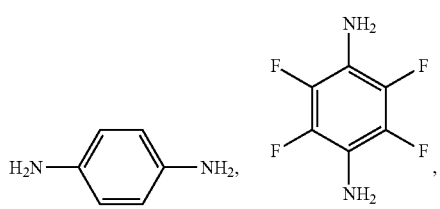

Specifically, $Y_2$ may preferably be a residue derived from the structure shown below, but it is not limited thereto:

The structure of formula III can be, for example:

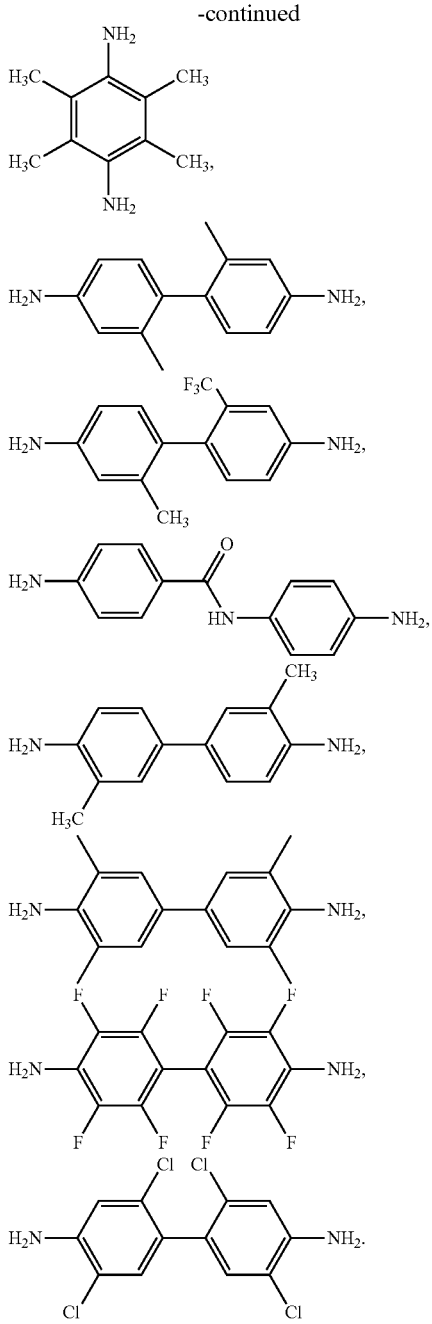

The structure of formula IV can be, for example:

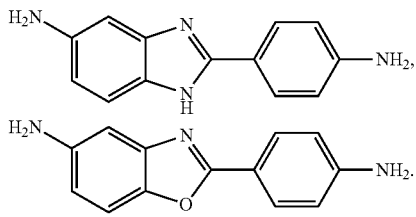

More preferably, $Y_2$ is selected from a residue derived from a diamine represented by the following formulas III-1 to III-4, and IV-1, or a combination thereof:

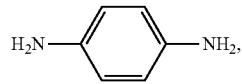  (III-1)

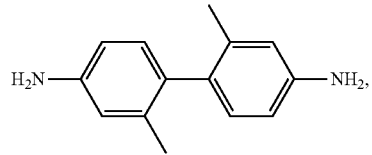  (III-2)

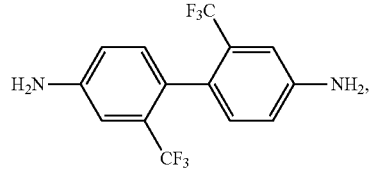  (III-3)

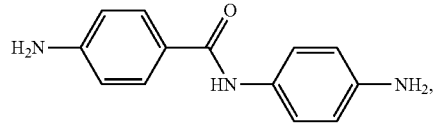  (III-4)

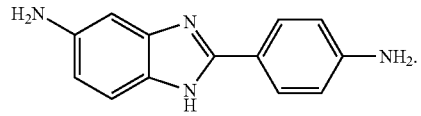  (IV-1)

In some preferred embodiments, $Y_3$ is a residue derived from a diamine represented by formula V,

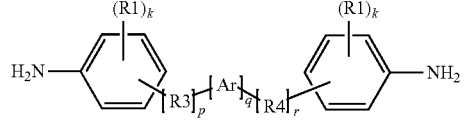  (V)

each R1 is independently *—H, *—F, *—Cl, *—CH$_3$ or *—CF$_3$;

R3 and R4 are each independently *—O—* or *—C(O)O—*;

Ar is

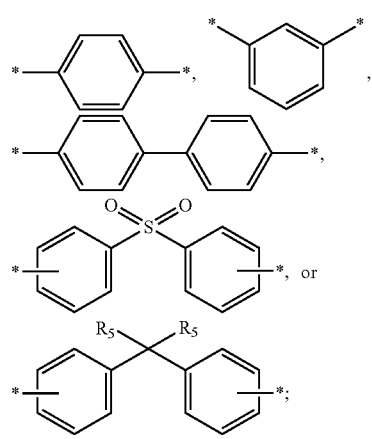

R5 is *—CH₃ or *—CF₃;
p, q, and r are 0 or 1;
k is an integer of 0-4,
wherein * represents the bonding site.
In some embodiments, $Y_3$ can be, for example, a residue derived from the structure shown below, but it is not limited thereto:
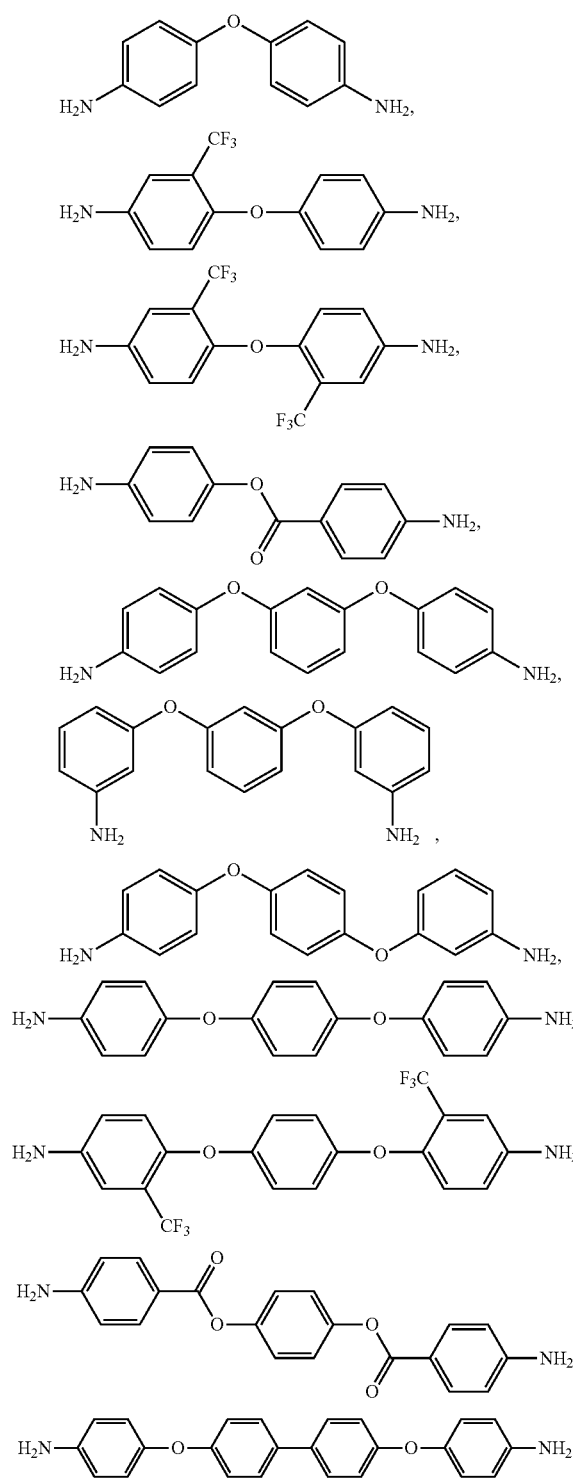
Specifically, $Y_3$ may preferably be a residue derived from the structure shown below, but is not limited thereto:
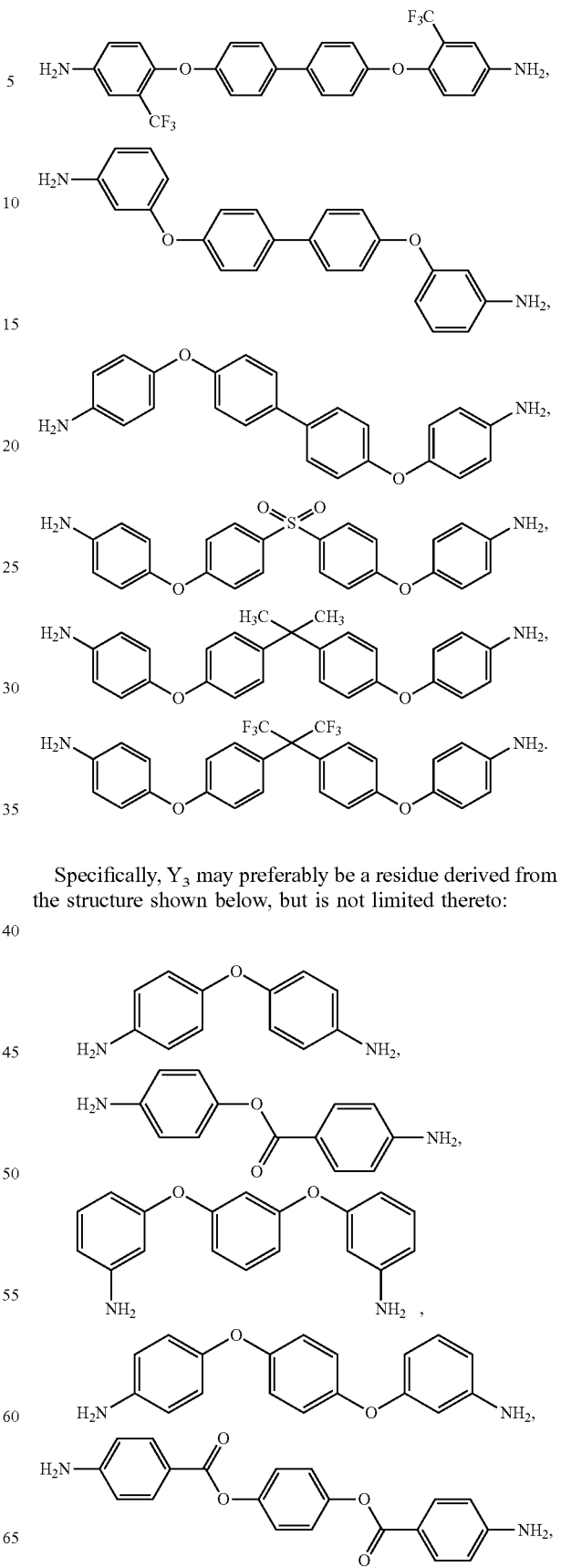

-continued

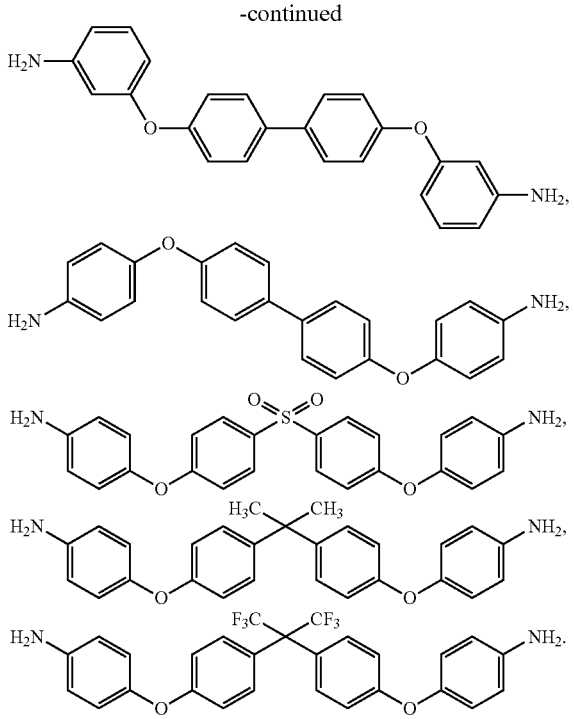

More preferably, Y₃ is selected from a residue derived from a diamine represented by the following formula V-1 to V-3, or a combination thereof:

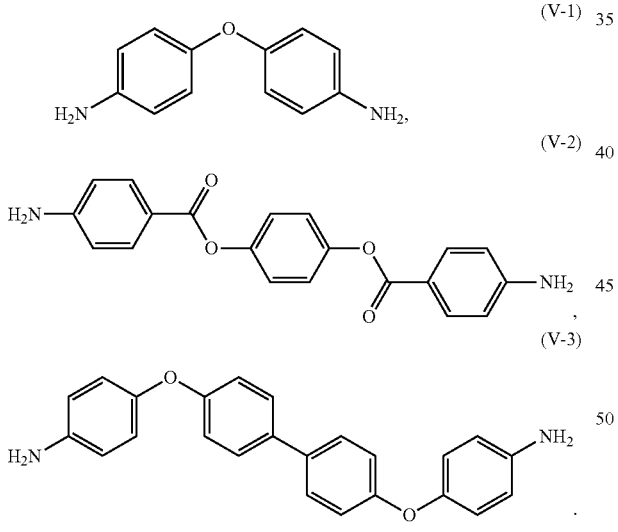

As mentioned above, in order to meet the higher temperature process required for LTPS TFT or other subsequent applications, a transparent polyimide with high heat resistance is required. Specifically, the existing polyimide materials become yellowing during high-temperature process, which adversely affects the performance of color properties. Therefore, it is desirable to provide polyimide materials that can maintain good optical properties after the high-temperature process to meet the requirements of transparent materials.

In some embodiments of the present disclosure, the monomers and ratios of specific structures are selected to provide a polyamic acid and a polyimide formed therefrom with good heat resistance and optical properties. In particular, an embodiment of the present disclosure provides a polyamic acid, whose molar fractions of the repeating units represented by the general formulas M″, N″, and O″ to all of the repeating units are m, n, and o, respectively, wherein m+n+o≤1. In some embodiments, m is 0-100%, n is 0-100%, and o is 0-50%, wherein m, n, and o are not zero at the same time. In some embodiments, m is 40%-80%, n is 20%-50%, and o is 0-40%. In some embodiments, m is 40%-60%, n is 40%-60%, and o is 0.

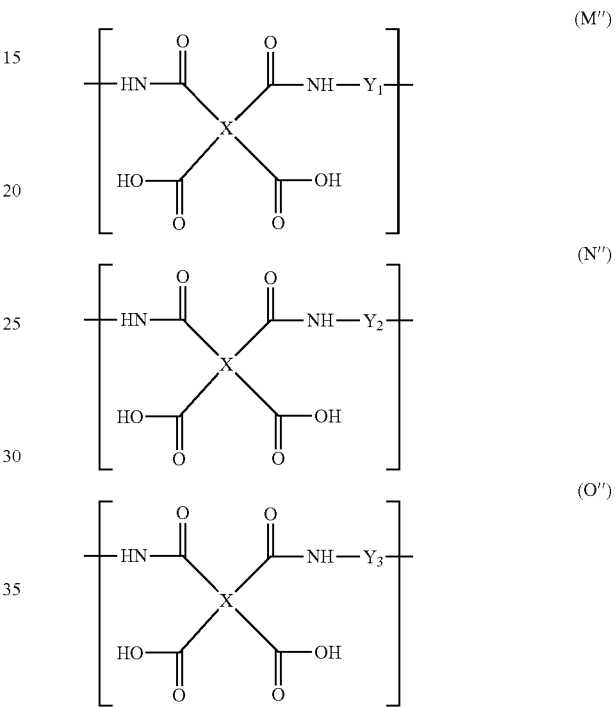

$Y_1$, a residue derived from a diamine with a cardo structure, in general formula M″ provides excellent heat resistance and the required optical properties as mentioned above. $Y_2$, a residue derived from a diamine with aromatics such as a benzene ring, biphenyl, etc., in general formula N″ also provides good heat resistance and the desired optical properties, linear coefficient of thermal expansion (CTE), and other properties at the same time. $Y_3$, a residue derived from a diamine with an ether group or an ester group, in the general formula O″ can provide the desired optical properties and coefficient of thermal expansion properties.

In some embodiments, m, n, and o are 40%-60%, 40%-60%, and 0, respectively, and X, $Y_1$, and $Y_2$ are residues derived from TCA,

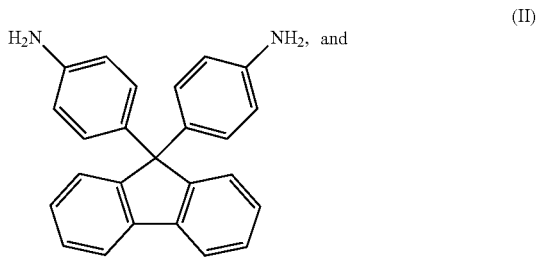 [SMILES: Nc1ccc(C2(c3ccc(N)cc3)c3ccccc3-c3ccccc32)cc1]

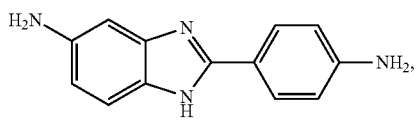
(IV-1)

In some embodiments, m, n, and o are 0, 100%, and 0, respectively, and X and $Y_2$ are residues derived from TCA and

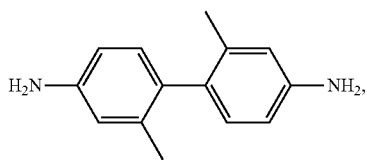
(III-2)

respectively.

In some embodiments, m, n, and o are 70%-90%, 10%-30%, and 0, respectively, and X, $Y_1$, and $Y_2$ are residues derived from TCA,

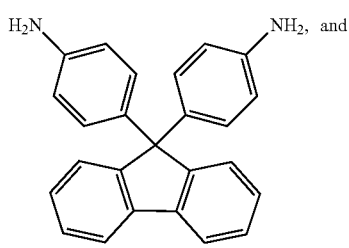
(II)

(III-1)

In some embodiments, m, n, and o are 40%-60%, 40%-60%, and 0, respectively. X and $Y_1$ are residues derived from TCA and

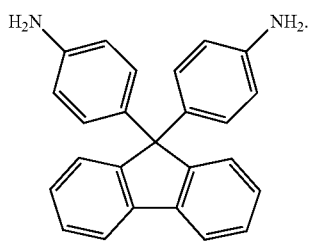
(II)

$Y_2$ is a residue derived from

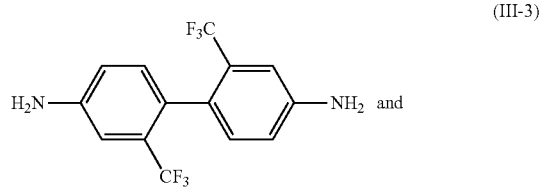
(III-3)

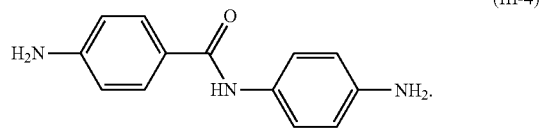
(III-4)

The inventors have found by experiments that, in some embodiments, under the condition that polyamic acid can be formed into a film, m, n, and o satisfying the following formula can make the polyimide film made of the polyamic acid have extremely high Tg to provide good heat resistance:

$$0.8m+0.6n+0.1o>0.5 \qquad \text{(Formula 1)}.$$

In accordance with some embodiments of the present disclosure, weight average molecular weight of the polyamic acid is preferably from 30,000 to 300,000, and more preferably from 80,000 to 200,000.

[Polyimide]

The embodiment of the present disclosure provides a polyimide containing at least one repeating unit selected from the group consisting of the following general formulas M, N, and O:

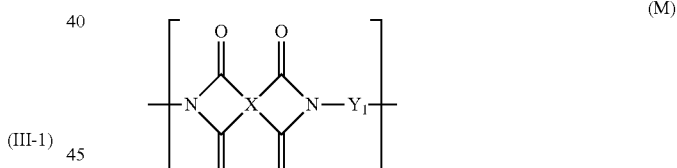
(M)

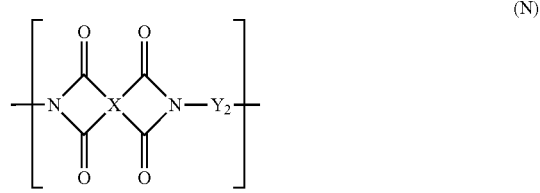
(N)

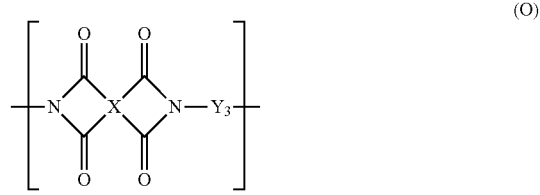
(O)

wherein X is a residue derived from TCA represented by formula I,

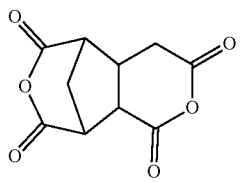

(I)

$Y_1$ is a residue derived from a diamine with a cardo structure, $Y_2$ is a residue derived from a diamine with the structure of a benzene ring, biphenyl, phenylbenzimidazole or phenylbenzoxazole, $Y_3$ is a residue derived from a diamine with an ether group or an ester group.

As mentioned above, the embodiment of the present disclosure selects monomers and ratios of specific structures to provide polyamic acid and polyimide formed therefrom with good heat resistance and optical properties. In particular, in some embodiments of the present disclosure, the molar fractions of the repeating units represented by the general formulas M, N, and O of the polyimide to all repeating units are m, n, and o, respectively, wherein $m+n+o \leq 1$. The ranges, definitions, and specific examples of m, n, o, $Y_1$, $Y_2$, and $Y_3$ are the same as described above, and will not be repeated here.

The inventors have found by experiments that, in some embodiments, under the condition that polyimide can be formed into a film, m, n, and o satisfying the following formula can make the polyimide film made of polyimide mentioned above have extremely high Tg to provide good heat resistance:

$$0.8m+0.6n+0.1o>0.5 \qquad \text{(Formula 1)}.$$

In addition, the polyimide film made of polyamic acid or polyimide mentioned above not only has good heat resistance, but also has good optical properties, and can maintain good optical properties after high-temperature process. The followings will be described in detail.

In accordance with some embodiments of the present disclosure, the weight average molecular weight of polyimide is preferably from 30,000 to 300,000, and more preferably from 80,000 to 200,000.

[Process for Manufacturing Polyamic Acid]

In some embodiments, the polyamic acid polyimide is formed by the following method: mixing TCA represented by formula I and diamine compound in a solvent for condensation polymerization to form polyamic acid. In some embodiments, the condensation polymerization reaction may be performed at room temperature under a nitrogen atmosphere at stirring speed of 200-400 rpm for 3 to 12 hours, for example, at room temperature at stirring speed of 300 rpm for 4 hours. After the reaction is completed, it is cooled to obtain polyamic acid.

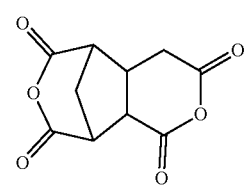

(I)

The molar ratio of diamine to TCA that is added can be appropriately selected according to requirements, usually about 1:0.9-1:1.1. In some embodiments, if the content of diamine is too high or the content of TCA is too high, the weight average molecular weight of the resulting polyamic acid may be too small.

The diamine compound used in the embodiment of the present disclosure is at least one selected from the group consisting of $y_1$, $y_2$, and $y_3$. $y_1$ is a diamine with a cardo structure. The structure of $y_1$ can be referred to the diamine structure mentioned above that can be derivatized to form the residue $Y_1$, which will not be repeated here. $y_2$ is a diamine with a benzene ring, biphenyl, phenylbenzimidazole, or phenylbenzoxazole. The structures of $y_2$ can be referred to the diamine structure mentioned above that can be derivatized to form the residues $Y_2$, which will not be repeated herein. $y_3$ is a diamine with an ether group or an ester group diamine. The structure of $y_3$ can be referred to the diamine structure mentioned above that can be derivatized to form the residues $Y_3$, which will not be repeated here.

The following table lists some specific examples of diamines and their corresponding chemical names.

| Diamine | Chemical Name |
| --- | --- |
| | 4,4'-(9-fluorenlidene)dianiline (FDA) |
| | p-Phenylenediamine (p-PDA) |

-continued

| Diamine | Chemical Name |
|---|---|
| | 2,2-Dimethylbenzidine (m-TB) |
| | 2,2'-bis(trifluoromethyl)benzidine (TFMB) |
| | 4,4'-Diaminobenzanilide (DABA) |
| | 5,4'-Diamino-2-phenylbenzimidazole (DAPBI) |
| | 4,4'-oxydianiline (ODA) |
| | Bis(4-aminophenyl) terephthalate (BPTP) |
| | 4-4'-(1,1'-Biphenyl-4,4'-diyldioxy)dianiline (BAPB) |

In some embodiments, the solvent can be anything that does not hinder the imidization reaction and can dissolve the resulting polyimide. For example, the solvent may be an aprotic solvent, aromatic hydrocarbon-based solvent, phenol-based solvent, ether-based solvent, carbonate-based solvent, etc., or a combination thereof, but is not limited thereto.

In some embodiments, the aprotic solvent can be, for example, amide-based solvent such as N,N-dimethylformamide, N,N-diethylformamide, N,N-dimethylacetamide, N,N-diethylacetamide, N-methylpyrrolidone, N-ethylpyrrolidone (NEP), N-methyl Caprolactam, 1,3-dimethylimidazolidone, tetramethylurea; lactone-based solvents such as γ-butyrolactone and γ-valerolactone; phosphonium-containing amide-based solvents such as hexamethylphosphoramide, hexamethylphosphoric triamide; sulfur-containing solvents such as dimethyl sulfone, dimethyl sulfoxide, diethyl sulfoxide, and sulfolane; ketone solvents such as acetone, cyclohexanone, methylcyclohexanone; amine solvents such as methylpyridine and pyridine; ester solvents such as acetic acid-2-methoxy-1-methylethyl ester, but is not limited thereto.

In some embodiments, the aromatic hydrocarbon solvent may be, for example, benzene, toluene, xylene, 1,3,5-trimethylbenzene, etc., but is not limited thereto.

In some embodiments, the phenol-based solvent may be, for example, phenol, o-cresol, m-cresol, p-cresol, 2,3-xylenol, 2,4-xylenol, 2,5-xylenol, 2,6-xylenol, 3,4-xylenol, 3,5-xylenol, etc., but not limited thereto.

In some embodiments, the ether solvent may be, for example, 1,2-dimethoxyethane, bis(2-methoxyethyl) ether, and 1,2-bis (2-methoxyethoxy) ethane, bis [2-(2-methoxyethoxy) ethyl] ether, tetrahydrofuran, 1,4-dioxane, etc.

In some embodiments, the carbonate-based solvent may be, for example, diethyl carbonate, methyl ethyl carbonate, ethyl acetate, and propyl carbonate, etc., but it is not limited thereto.

In some embodiments, the solvent is preferably N,N-dimethylformamide (DMF), N,N-diethylformamide, N,N-dimethylacetamide (DMAc), N,N-diethylacetamide, N-methylpyrrolidone (NMP), N-ethylpyrrolidone (NEP), dimethyl sulfoxide (DMSO), diethyl sulfoxide, γ-butyrolactone (GBL), xylene, tetrahydrofuran, or combinations thereof. In some embodiments, the solvent is more preferably γ-butyrolactone (GBL).

In accordance with some embodiments of the present disclosure, the range of the monomer to the total weight (solid content) during the reaction is preferably 15-50%, and more preferably 18-30%.

According to the study by the inventors, when the solid content is within the range mentioned above, the desired weight average molecular weight of the polyamic acid or the polyimide can be obtained.

[Process for Manufacturing Polyimide]

The embodiment of the present disclosure provides a polyimide, which is formed by the following methods: reacting a dianhydride and a diamine in a solvent to perform polymerization to obtain polyamic acid, and then performing imidization on polyamic acid to form polyimide. There are two synthetic methods for the imidization of polyamic acid. The first method is divided into two stages. First, the diamine and TCA monomer are placed in a polar solvent for reaction to form polyamic acid, the precursor of the polyimide. Then, a high-temperature method (300° C.-500° C.) or a chemical method is used to perform the imidization reaction to dehydrate the polyamic acid for ring closure to form a polyimide. In some embodiments, the high-temperature method is performed at a temperature of 300-500° C. for 4-8 hours, for example, at a temperature of 400° C. for 6 hours. In some embodiments, the chemical method is performed by adding acetic anhydride and a catalyst at room temperature to 120° C. for reaction for 3-24 hours, for example, at 90° C. for 16 hours. The second method is to synthesize polyimide in one stage. The diamine and TCA monomer are reacted in a polar aprotic solvent and heated to the reflux temperature and react to form polyimide. After the reaction is completed, it is cooled, recrystallized, purified, and dried to obtain a polyimide solid. Then, the polyimide solid is added to a solvent to prepare the polyimide varnish.

In accordance with some embodiments of the present disclosure, polyimide solids content (i.e., content of the polyimide to the total weight of the solvent and the polyimide) by weight % in the polyimide varnish is 5-30 wt %, preferably 8-20 wt %, and more preferably 10-15 wt %.

In accordance with the inventor's research, it is shown that when the solid content is within the range mentioned above, it has better coating and leveling properties during coating.

In some embodiments, the catalyst mentioned above can be any compound that can catalyze the dehydration and ring closure of polyamic acid to form polyimide. In some embodiments, the catalyst may be, for example, a base catalyst or an acid catalyst.

In some embodiments, the base catalyst may be, for example, organic base catalysts such as pyridine, quinoline, isoquinoline, α-methylpyridine, β-methylpyridine, 2,4-dimethylpyridine, 2,6-dimethylpyridine, N-ethylpiperidine, trimethylamine, triethylamine, tripropylamine, tributylamine, triethylenediamine, imidazole, N,N-dimethylaniline, N,N-diethylaniline; inorganic base catalysts such as potassium hydroxide, sodium hydroxide, potassium carbonate, sodium carbonate, potassium bicarbonate, sodium bicarbonate, but is not limited thereto.

In addition, the acid catalyst may be, for example, crotonic acid, acrylic acid, trans-3-hexenoic acid, cinnamic acid, benzoic acid, methylbenzoic acid, hydroxybenzoic acid, terephthalic acid, benzenesulfonic acid, and toluenesulfonic acid, naphthalenesulfonic acid, etc., but not limited thereto.

In some embodiments, the catalyst is preferably selected from isoquinoline, β-methyl pyridine, pyridine, N-ethylpiperidine, or combinations thereof. In some embodiments, the catalyst is more preferably N-ethylpiperidine.

In accordance with some embodiments of the present disclosure, the content of the polyimide to the total weight (solids content) of the solvent and the polyimide is preferably 8 to 20 wt %, and more preferably 10 to 15 wt %.

In accordance with the study by the inventors, it shows that when the solid content is within the range mentioned above, it has better coating and leveling properties during coating.

[Element]

The elements of the present disclosure contain one or more of the polyimides mentioned above and may be applied to an electronic device. In some embodiments, the element may be an optical element, for example, a transparent film, a transparent substrate, a transparent sheet, a transparent layer, etc., but is not limited thereto.

In some embodiments of the present disclosure, the term "electronic device" is herein intended to mean a device including one or more organic semiconductor layers or materials. In some embodiments, an electronic device includes, but is not limited to: (1) a device that converts electrical energy into radiation (e.g., a light-emitting diode, light emitting diode display, diode laser, or lighting panel), (2) a device that detects a signal using an electronic process (e.g., a photodetector, a photoconductive cell, a photoresistor, a photoswitch, a phototransistor, a phototube, an infrared ("IR") detector, or a biosensors), (3) a device that converts radiation into electrical energy (e.g., a photovoltaic device or solar cell), (4) a device that includes one or more electronic components (e.g., a transistor or diode) that include one or more organic semiconductor layers, or any combination of devices in items (1) through (4).

In some embodiments, since the polyimide thin film is to substitute glass in the electronic display device, it should satisfy the limiting conditions that the polyimide have good optical properties. As mentioned above, the polyimide thin film provided by the embodiments of the present disclosure not only has good heat resistance, but also has good optical properties, and can maintain good optical properties after high-temperature process. In some embodiments, the polyimide thin film of the embodiment of the present disclosure has a thickness of 5 μm-50 μm, preferably 5 μm-15 μm. Besides, in some embodiments, the polyimide thin film of the embodiment of the present disclosure meets at least one optical property of the followings: (1) total light transmittance (T.T)>80%, (2) yellow index (YI)<5, (3) b*<3, (4) haze<2.5%. Therefore, the polyimide provided by the embodiment of the present disclosure has good optical properties, and thus it can be used in electronic display devices to replace glass.

The polyimide of the embodiment of the present disclosure has a total light transmittance (T.T) greater than 80%, preferably greater than 85%, and more preferably greater than 88%.

The polyimide of the embodiments of the present disclosure has a yellow index (YI) less than 5, preferably less than 3.5, and more preferably less than 3.

The polyimide of the embodiment of the present disclosure has a b* less than 3, preferably less than 2, and more preferably less than 1.5.

The polyimide of the embodiment of the present disclosure has a haze less than 2.5%, preferably less than 1.5%, and more preferably less than 1%.

In addition, in practical applications, the heat resistance can be depended on the glass transition temperature (Tg), wherein Tg>300° C. has good heat resistance. The polyimide of the embodiment of the present disclosure has a glass transition temperature (Tg) greater than 300° C., preferably greater than 350° C., and more preferably greater than 400° C.

Furthermore, the polyimide of the embodiment of the present disclosure has a 5% weight loss temperature ($Td_{5\%}$) greater than 350° C., preferably greater than 400° C., and more preferably greater than 450° C. The polyimide of embodiments of the present disclosure also has a linear coefficient of thermal expansion (CTE) less than 55 ppm/° C., preferably less than 50 ppm/° C., and more preferably less than 45 ppm/° C.

In some embodiments, polyimide varnish with a thickness of 100-300 μm can be coated on the glass substrate by a wet-coating method, and then heated at a temperature of 50° C.-250° C. by a heating plate to evaporate the solvent and to obtain polyimide film with a thickness of 5-15 μm.

In some embodiments, the polyimide thin film of the present disclosure can be used as elements in a liquid crystal display (LCD). In an embodiment of the present disclosure, the polyimide disclosed in the present disclosure can be used as an alignment layer in a display device. In another embodiment of the present disclosure, the polyimide thin film of the present disclosure may be used as elements in an organic electronic device with organic light-emitting diode (OLED). At last, in some embodiments, the polyimide thin film of the present disclosure can be used as a transparent protective filter of the camera.

In some embodiments, the element of the present disclosure may also be a non-optical device, such as a semiconductor device.

In the following, the present disclosure will provide several examples to explain more specifically the effects that polyamic acid and polyimide can achieved according to the embodiments of the present disclosure, and the properties of polyamic acid and polyimide prepared by applying the present disclosure. However, the following examples are for illustrative purposes only, and should not be interpreted as limitations on the implementation of the disclosure.

[Preparation Example 1] Polyamic Acid

A half-moon shaped Teflon stirring blade, a nitrogen-intake pipe, and a condensing apparatus for introducing cooling water were set up on a 250 ml three-necked round-bottom flask. 0.0223 mole of 2,2'-bis(trifluoromethyl)benzidine (TFMB) (manufactured by Zhonghou Chemical Co., Ltd.), 7.7704 g (0.0223 mole) of 4,4'-(9-fluorenylidene)dianiline (FDA) (manufactured by JFE Chemical Co., Ltd.), 45 g of γ-butyrolactone (manufactured by Hongsheng chemical Co., Ltd.) were added to the three-necked flask and stirred at a rotational speed of 300 rpm at room temperature under a nitrogen atmosphere to obtain a clearing solution. 10.0000 g (0.0446 mole) of (3-(Carboxymethyl)-1,2,4-cyclopentanetricarboxylic acid 1,4:2,3-dianhydride (TCA) (manufactured by LCY Chemical Industries Co., Ltd) and 45 g of γ-butyrolactone (manufactured by Hong-Chemical Co., Ltd) were added to the solution and then stirred at 300 rpm for polymerization reaction. Four hours after the reaction, a viscous reaction solution was obtained. 90 g of γ-butyrolactone (manufactured by Hong-Chemical Co., Ltd) was added to the solution for dilution and stirred for 0.5 hours to obtain a polyamic acid used in the present experiment.

[Preparation Example 2] Polyamic Acid

The same procedure as described in Preparation Example 1 was repeated, except that 2,2'-bis(trifluoromethyl)benzidine (TFMB) was not used in Preparation Example 2, 4,4'-(9-fluorenylidene)dianiline (FDA) in Preparation Example 2 were 1.2 times of FDA in Preparation Example 1, and 0.0178 mole of 4,4'-oxydianiline (ODA) (manufactured by Shi manufactured peak Technology Co., Ltd) were used in Preparation Example 2. The polyamic acid used in this experiment could be obtained.

[Preparation Example 3] Polyamic Acid

Except that 2,2'-bis(trifluoromethyl)benzidine (TFMB) was not used in Preparation Example 3, and 0.0223 mole of 5,4'-Diamino-2-phenylbenzimidazole (DAPBI) (manufactured by Asahi Biotechnology Co., Ltd.) was used in Preparation Example 3, the rest was the same as Preparation Example 1. The polyamic acid used in this experiment could be obtained.

[Preparation Example 4] Polyamic Acid

The same procedure as described in Preparation Example 1 was repeated, except that 4,4'-(9-fluorenylidene)dianiline (FDA), 2,2'-bis(trifluoromethyl)benzidine (TFMB) were not used in Preparation Example 4, and 0.0446 mole of 2,2-Dimethylbenzidine (m-TB) (manufactured by TCI Tokyo Chemical industry Co., Ltd.) was used in Preparation Example 4. The polyamic acid used in this experiment could be obtained.

[Preparation Example 5] Polyamic Acid

The same procedure as described in Preparation Example 1 was repeated, except that 4,4'-(9-fluorenylidene)dianiline (FDA) and 2,2'-bis(trifluoromethyl)benzidine (TFMB) in Preparation Example 5 were 0.8 times of those in Preparation Example 1, and 0.0089 mole of the bis(4-aminophenyl) terephthalate (BPTP) was used in Preparation Example 5. The polyamic acid used in this experiment could be obtained.

[Preparation Example 6] Polyamic Acid

The same procedure as described in Preparation Example 1 was repeated, except that 2,2'-bis(trifluoromethyl)benzidine (TFMB) was not used in preparation Example 6, 4,4'-(9-fluorenylidene)dianiline (FDA) in Preparation Example 6 was 1.6 times of FDA in Preparation Example 1, and 0.0089 mole p-phenylenediamine (p-PDA) (manufactured by TCI Tokyo Chemical industry Co., Ltd.) was used in preparation Example 6. The polyamic acid used in this experiment could be obtained.

[Preparation Example 7] Polyamic Acid

The same procedure as described in Preparation Example 1 was repeated, except that 2,2'-bis(trifluoromethyl)benzidine (TFMB) in Preparation Example 7 was 0.5 times of TFMB in Preparation Example 1, and 0.0112 mole of 4,4'-diaminobenzanilide (DABA) (manufactured by John new international Co., Ltd.) was used in Preparation Example 7. The polyamic acid used in this experiment could be obtained.

[Preparation Example 8] Polyamic Acid

The same procedure as described in Preparation Example 1 was repeated, except that 4,4'-(9-fluorenylidene)dianiline (FDA) in Preparation Example 8 was 0.8 times of FDA in Preparation Example 1, and 0.0045 mole of (4,4'-(1,1'-biphenyl-4,4'-diyldioxy)dianiline (BAPB) (manufactured by Taiwan Merck Co., Ltd.) was used in Preparation Example 8. The polyamic acid used in this experiment could be obtained.

[Preparation Example 9] Polyamic Acid

The same procedure as described in Preparation Example 1 was repeated, except that 4,4'-(9-fluorenylidene)dianiline (FDA) was not used in Preparation Example 9, and 0.0223 mole of 4,4'-oxydianiline (ODA) was used in Preparation Example 9. The polyamic acid used in this experiment could be obtained.

[Preparation Example 10] Polyamic Acid

The same procedure as described in Preparation Example 1 was repeated, except that 4,4'-(9-fluorenylidene)dianiline (FDA) was not used in Preparation Example 10, and 0.0223 mole bis(4-aminophenyl) terephthalate (BPTP) was used in Preparation Example 10. The polyamic acid used in this experiment could be obtained.

[Preparation Example 11] Polyamic Acid

The same procedure as described in Preparation Example 1 was repeated, except that 2,2'-bis(trifluoromethyl)benzidine (TFMB) was not used in Preparation Example 11, and 0.0223 mole of 4,4'-(1,1'-biphenyl-4,4'-diyldioxy)dianiline (BAPB) was used in Preparation Example 11. The polyamic acid used in this experiment could be obtained.

[Preparation Example 12] Polyamic Acid

The same procedure as described in Preparation Example 1 was repeated, except that 4,4'-(9-Fluorenylidene)dianiline (FDA) and 2,2'-bis(trifluoromethyl)benzidine (TFMB) were not used in Preparation Example 12, and 0.0446 mole of 4,4'-(1,1'-biphenyl-4,4'-diyldioxy)dianiline (BAPB) was used in Preparation Example 12. The polyamic acid used in this experiment could be obtained.

[Example 1] Polyimide 18.2 g of acetic anhydride and 15.1 g of N-ethylpiperidine were added to the polyamic acid of Preparation Example 1, and heated in an oil bath to maintain the system at 90° C. for 16 hours.

Then, the reaction system was cooled to room temperature. The reaction solution was taken out and was added dropwise to methanol to precipitate solid. After the solid was filtered with filter paper, and washed with methanol three times. Then, the solid was dried at 200° C. under vacuum for 5 hours. A clean polyimide solid was obtained.

[Examples 2-12] Polyimide

The same procedure as described in Example 1 was repeated, except that polyamic acids used in the Examples 2-12 were the polyamic acids obtained in Preparation Examples 2-12, respectively. The polyimide solids of Examples 2-12 were obtained.

The measurements of the weight average molecular weight (Mw) of polyamic acid and polyimide were performed by gel chromatography (GPC method) under the following conditions.
Device: Alliance2695
Column: Shodex KD-803, KD-804, KD-805, KD-G 4A
Column temperature: 40° C.
Solvent: DMAc/LiBr/phosphoric acid/THF (0.1 wt %)
Flow rate: 1.0 mL/min
Concentration of solid content of tested liquid: 0.5% by mass
Injection volume: 50 μL
Detector: RI
Standard material for calibration: EasiCal PS-2 (manufactured by Agilent Technologies Co., Ltd.)

The ratio (Mw/Mn) of the weight average molecular weight to the number average molecular weight of polystyrene obtained above are defined as the degree of dispersion.

The components of the Examples and their corresponding molar fraction mentioned above are tabulated in Table 1. The selected type of each component are described below. The dianhydride is defined as 1 mole fraction, and the sum of the diamines are also defined as 1 mole fraction.

TABLE 1

| Polyimide Composition | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Diacid anhydride | | TCA | 1 | 1 | 1 | 1 | 1 | 1 | 1 | 1 | 1 | 1 | 1 | 1 |
| Diamine | m | FDA | 0.5 | 0.6 | 0.5 | | 0.4 | 0.8 | 0.5 | 0.4 | | | 0.5 | |
| | n | TFMB | 0.5 | | | | 0.4 | | 0.25 | 0.5 | 0.5 | 0.5 | | |
| | | m-TB | | | | 1.0 | | | | | | | | |
| | | p-PDA | | | | | | 0.2 | | | | | | |
| | | DAPBI | | | 0.5 | | | | | | | | | |
| | | DABA | | | | | | | 0.25 | | | | | |
| | o | ODA | | 0.4 | | | | | | | 0.5 | | | |

TABLE 1-continued

| Polyimide Composition | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| | BPTP | | | | | 0.2 | | | | | 0.5 | | |
| | BAPB | | | | | | | | 0.1 | | | 0.5 | 1 |
| formula | $0.8 m + 0.6 n + 0.1 o$ | 0.7 | 0.52 | 0.7 | 0.6 | 0.58 | 0.76 | 0.7 | 0.63 | 0.35 | 0.35 | 0.45 | 0.1 |

In Table 1, each component represents the following compounds:
TCA: 3-(Carboxymethyl)-1,2,4-cyclopentanetricarboxylic acid 1,4:2,3-dianhydride (manufactured by Li Changrong Chemical Industry Co., Ltd.)
FDA: 4,4'-(9-fluorenylidene)dianiline (manufactured by JFE Chemical Co., Ltd.)
TFMB: 2,2'-bis(trifluoromethyl)benzidine (manufactured by Zhonghou Chemical Co., Ltd.)
m-TB: 2,2-dimethylbenzidine (manufactured by TCI Chemical Industry Development Co., Ltd.)
p-PDA: p-phenylenediamine (manufactured by Merck Taiwan Co., Ltd.)
DAFBI: 5,4'-Diamino-2-phenylbenzimidazole (manufactured by Asahi Biotechnology Co., Ltd.)
DABA: 4,4'-Diaminobenzanilide (manufactured by Hanxin International Co., Ltd.)
ODA: 4,4'-oxydianiline (manufactured by Shifeng Technology Co., Ltd.)
BPTP: bis(4-aminophenyl) terephthalate (manufactured by Merck Taiwan Co., Ltd.)
BAPB: 4,4'-(1,1'-biphenyl-4,4'-diyidioxy)dianiline (manufactured by Merck Taiwan Co., Ltd.)

[Manufacture of Polyimide Varnish]

The polyimide solids in Examples 1 to 12 was added to γ-butyrolactone, respectively, to obtain polyimide varnish with a solid content of 12 wt %.

[Manufacture of Polyimide Thin Film]

The polyimide varnish with a thickness of 200 μm can be coated on the glass substrate by a wet-coating method. The solvent was evaporated by a hot plate heating at a temperature of 50° C. for 30 minutes, 150° C. for 60 minutes, and 240° C. for 60 minutes to obtain a thin film with a thickness of 10 μm. Then, various properties of the thin film made of polyimide of Examples 1 to 12 were measured by the following test methods, and were reported in Table 2.

[Glass Transition Temperature (Tg) Test]

TA Instruments thermomechanical analyzer "TMA/Q400" was used to analyze the glass transition temperature by using a thin film tensile test fixtures. The sample was cut into 16 mm×5 mm and the two ends of the test piece were clamped with the thin film tensile test fixtures and placed in the TMA. Nitrogen was injected at a flow rate of 100 ml/min as a protective atmosphere, and a fixed load of 0.05N was applied. The sample was heated from 50° C. to 350° C. at a heating rate of 10° C./min, then used natural cooling to reduce to 50° C., and then heated to 500° C. at a heating rate of 10° C./min. The turning point of the slope change in the data measured by TMA is Tg.

[5% Weight Loss Temperature ($Td_{5\%}$) Test]

TA Instruments thermogravimetric analyzer "TGA/Q500" was used to analyze the weight loss temperature. The sample was cut into 5 mm×5 mm. The cut samples with a total weight of 5-6 mg were stacked in a tray, and a flow rate of 60 ml/min of nitrogen atmosphere was injected. The sample was heated from 40° C. to 900° C. at a heating rate of 10° C./min, and the decomposition temperature of 1 wt % and 5 wt % could be measured.

[Linear Coefficient of Thermal Expansion (CTE) Test]

TA Instruments thermomechanical analyzer "TMA/Q400" was used to analyze the linear coefficient of thermal expansion by using a thin film tensile test fixtures. The sample was cut into 16 mm×5 mm and the two ends of the test piece were clamped with the thin film tensile test fixtures and placed in the TMA. Nitrogen was injected at a flow rate of 100 ml/min as a protective atmosphere, and a fixed load of 0.05N was applied. The sample was heated from 50° C. to 350° C. at a heating rate of 10° C./min, then used natural cooling to reduce to 50° C., and then heated to 500° C. at a heating rate of 10° C./min. The CTE value could be obtained by extracting the slope of 50-200° C. from the TMA measurement data.

[Total Light Transmittance (T.T) Test]

In accordance with ASTM D1003, spectrophotometer "CSP-001" manufactured by Nippon Denshoku Industries Co., Ltd. was used to perform the measurement.

[Yellow Index Test (YI) Test]

In accordance with ASTM D1925, spectrophotometer "CSP-001" manufactured by Nippon Denshoku Industries Co., Ltd. was used to perform the measurement.

[b Value (b*) Test]

In accordance with ASTM D1925, spectrophotometer "CSP-001" manufactured by Nippon Denshoku Industries Co., Ltd. was used to measure CIE L*a*b* coordinates.

[Haze (a Haze) Test]

In accordance with ASTM D1003, spectrophotometer "CSP-001" manufactured by Nippon Denshoku Industries Co., Ltd. was used to perform the measurement.

TABLE 2

| Polyimide film properties | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Tg (° C.) | 427.83 | 432.69 | 461.74 | 422.00 | 412.08 | 461.76 | 446.57 | 426.63 | 386.83 | 356.26 | 369.43 | 305.30 |
| $Td_{5\%}$ (° C.) | 472.42 | 471.85 | 470.75 | 401.00 | 417.27 | 478.90 | 454.05 | 471.16 | 464.28 | 458.39 | 449.13 | 442.50 |
| CTE (ppm/° C.) | 41.69 | 52.38 | 35.26 | 39.00 | 44.68 | 49.31 | 39.84 | 42.95 | 40.23 | 41.22 | 46.41 | 38.20 |
| T.T (%) | 89.2 | 88.4 | 88.1 | 89.2 | 89.4 | 88.5 | 89.0 | 89.6 | 90.3 | 89.4 | 89.1 | 88.5 |
| YI | 1.40 | 1.45 | 3.27 | 2.56 | 1.74 | 2.16 | 1.80 | 1.20 | 1.00 | 1.64 | 1.43 | 1.51 |
| b* | 0.60 | 0.96 | 1.70 | 0.90 | 0.96 | 1.14 | 0.85 | 0.65 | 0.54 | 0.89 | 0.65 | 0.79 |
| Haze (%) | 0.60 | 0.50 | 0.1.2 | 1.41 | 0.09 | 0.31 | 0.50 | 0.45 | 0.45 | 0.40 | 0.70 | 0.70 |

It can be seen from Examples of 1-12 in Table 1 and Table 2, some Examples of the present disclosure selected monomer of specific structure and proportion to make the resulting film with excellent heat resistance and optical properties.

Specifically, the glass transition temperatures (Tg) of Examples 1 to 12 were all greater than 300° C., having good heat resistance. Further, when the mole fraction of m was 40%-60%, n was 40%-60%, and o was 0 (as shown in Examples 1, 3, and 7-8), the glass transition temperatures were all greater than 400° C., having better heat resistance.

Still further, as shown in Examples 1 to 8, when the mole fraction of m, n, and o satisfied the following formula:

$$0.8m+0.6n+0.1o>0.5 \quad \text{(Formula 1)},$$

the glass transition temperatures were greater than 350° C., even more than 400° C., i.e., having an excellent heat resistance.

In summary, by containing at least one repeating unit selected from the group consisting of formulas M, N, and O, the polyimide thin film made of the polyimide can has good heat resistance and optical properties. Furthermore, by making the molar fractions m, n, and o of the repeating units represented by the general formulas M, N, and O to all of the repeating units to be a specific ratio or satisfy formula 1, the thin film made of polyimide could further has excellent heat resistance.

The foregoing outlines features of several embodiments such that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A polyimide comprising at least one repeating unit selected from the group consisting of the following general formulas M, N, and O:

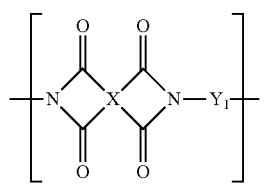
(M)

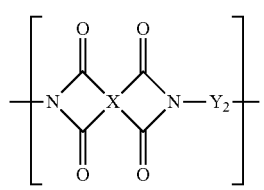
(N)

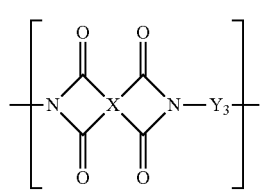
(O)

wherein X is a residue derived from TCA (3-(Carboxymethyl)-1,2,4-cyclopentanetricarboxylic acid 1,4:2,3-dianhydride) represented by formula I,

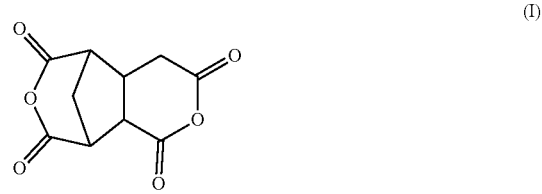 [SMILES: O=C1CC2C3CC(C(=O)OC3=O)C2C(=O)O1]
(I)

$Y_1$ is a residue derived from a diamine with a cardo structure, $Y_2$ is a residue derived from a diamine represented by formula IV,

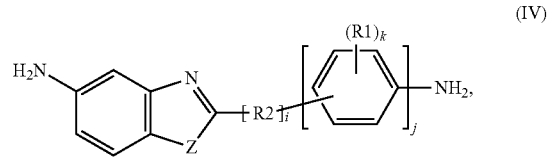
(IV)

and $Y_3$ is a residue derived from a diamine represented by formula V,

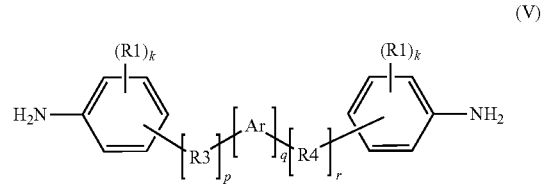
(V)

wherein each R1 is independently *—H, *—F, *—Cl, *—CH$_3$, or *—CF$_3$;

R2 is *—C(O)NH—*;

R3 and R4 are each independently *—O—* or *—C(O)O—*;

Ar is

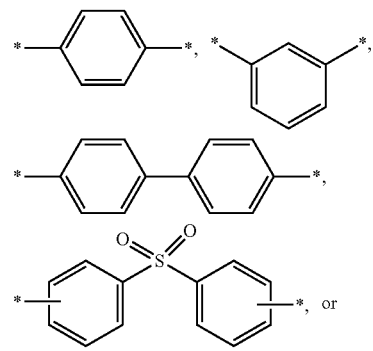

-continued

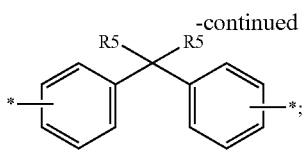

R5 is *—CH$_3$ or *—CF$_3$;
Z is *—NH—* or *—O—*:
i, j, p, q and r are 0 or 1;
k is an integer of 0-4;
wherein molar fractions of the repeating units represented by the general formulas M, N, and O to all of the repeating units are m, n, and o, respectively, wherein m is 0-100%, n is 20-100%, and o is 0-50%.

2. The polyimide as claimed in claim 1, wherein Y$_1$ is a residue derived from FDA (9,9-Bis(4-aminophenyl) fluorene) represented by formula II,

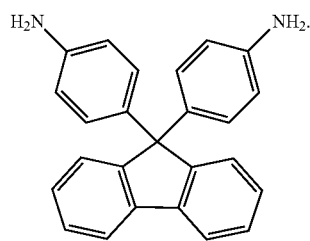

(II)

3. The polyimide as claimed in claim 2, wherein Y$_2$ is a residue derived from a diamine represented by IV-1,

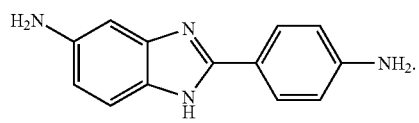

(IV-1)

4. The polyimide as claimed in claim 1, wherein m, n, and o satisfy the following formula:

$$0.8m+0.6n+0.1o>0.5 \quad\quad \text{(Formula 1)}.$$

5. An element comprising one or more of the polyimides according to claim 1.

6. The element as claimed in claim 5, wherein the element satisfies at least one of the following optical properties:
   (1) when the element is measured at a wavelength range of 400-800 nm in accordance with ASTM D1003, total light transmittance (T.T) of the element is greater than 80%,
   (2) when the element is measured in accordance with ASTM D1925, yellow index (YI) of the element is less than 5,
   (3) when the element is measured in accordance with ASTM D1925, b* of the element is less than 3,
   (4) when the element is measured in accordance with ASTM D1003, haze of the element is less than 2.5%.

7. A method of manufacturing the polyimide as claimed in claim 1 comprising performing an imidization of a polyamic acid.

8. The method of manufacturing polyimide as claimed in claim 7, wherein the imidization is performed at 80-100° C.

9. The method of manufacturing polyimide as claimed in claim 7, wherein the imidization is performed by adding an acetic anhydride and a catalyst to dehydrate the polyamic acid for ring closure to form the polyimide.

10. The method of manufacturing the polyimide as claimed in claim 9, wherein the catalyst is selected from isoquinoline, β-methylpyridine, pyridine, N-ethylpiperidine, or a combination thereof.

* * * * *